(12) United States Patent
Powell et al.

(10) Patent No.: US 7,503,121 B2
(45) Date of Patent: Mar. 17, 2009

(54) TOOL-LESS ADJUSTABLE FOOT ASSEMBLY FOR A POWER HAND TOOL

(75) Inventors: Dennis Powell, Elk Grove Village, IL (US); Mark Heintz, Glen Ellyn, IL (US); Ivan Guo, Wheeling, IL (US); Sean Gallagher, Arlington Heights, IL (US); Richard LaSota, Chicago, IL (US); Richard Sutkowski, Long Grove, IL (US)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 11/169,826

(22) Filed: Jun. 29, 2005

(65) Prior Publication Data
US 2007/0000368 A1 Jan. 4, 2007

(51) Int. Cl.
*B23D 49/10* (2006.01)
*B07B 19/09* (2006.01)
(52) U.S. Cl. .................................. 30/376; 30/392
(58) Field of Classification Search .................. 30/376, 30/392, 373–375, 393, 394; 83/574, 747
See application file for complete search history.

(56) References Cited

U.S. PATENT DOCUMENTS

| | | | | |
|---|---|---|---|---|
| 3,146,809 A | * | 9/1964 | Botefuhr | 30/376 |
| 3,863,342 A | * | 2/1975 | Griffies et al. | 30/393 |
| T0,941,019 I4 | * | 12/1975 | Kranzler et al. | 30/376 |
| 3,942,251 A | * | 3/1976 | Griffies et al. | 30/376 |
| 4,566,190 A | * | 1/1986 | Isakson | 30/373 |
| 5,535,520 A | * | 7/1996 | Armstrong | 30/375 |
| 5,727,322 A | * | 3/1998 | Giacometti | 30/376 |
| 6,178,646 B1 | * | 1/2001 | Schnell et al. | 30/392 |
| 6,230,411 B1 | * | 5/2001 | Wall et al. | 30/376 |
| 6,357,124 B1 | * | 3/2002 | Wall et al. | 30/376 |
| 6,553,675 B2 | * | 4/2003 | Orrico | 30/376 |
| 7,065,884 B2 | * | 6/2006 | Tam et al. | 30/376 |
| 2004/0168561 A1 | * | 9/2004 | Tam et al. | 83/747 |
| 2005/0229408 A1 | * | 10/2005 | Ngan et al. | 30/376 |

FOREIGN PATENT DOCUMENTS

EP 0 603 552 * 6/1994 .................. 30/376

* cited by examiner

*Primary Examiner*—Clark F. Dexter
(74) *Attorney, Agent, or Firm*—Greer, Burns & Crain, Ltd.

(57) ABSTRACT

A preferred embodiment of the present invention comprises a foot assembly for a power hand tool such as a jigsaw that has an angularly adjustable support foot with a generally flat bottom, at least two spaced apart supports connected to the support foot, an elongated rod extends through apertures in the supports in a configuration that permits limited sliding movement and the angular adjusting movement of the support foot relative to the hand tool, a retainer member associated with the hand tool that selectively engages one of the supports to lock the support foot at predetermined angular positions, and a spring biases the retainer member toward engagement with the support. A second embodiment includes a removable transparent plate that attaches to the support foot and has a faux laser line for a cutting aid.

18 Claims, 8 Drawing Sheets

TOOL-LESS ADJUSTABLE FOOT ASSEMBLY FOR A POWER HAND TOOL

FIELD OF THE INVENTION

The present invention generally relates to power hand tools of the type which have foot assemblies.

BACKGROUND OF THE INVENTION

Electric power hand tools such as portable electric jigsaws are well known in the art and have been the subject of continued research and development that has resulted in commercial products that are more convenient to operate and enable users to produce superior results. Generally, they include an AC, DC or universal electric motor contained in a housing and a tool such as a saw blade operatively driven by the shaft. In the case of a jigsaw as well as other cutting tools, a foot assembly is provided which is connected to the base of the tool housing and generally comprises a flat bottom surface platform for engaging a work piece during operation.

Most jigsaws and some other power tools have a foot assembly that can be tilted relative to the tool housing so that cuts can be made at an angle to achieve a beveled cut. While foot assemblies that can be tilted have been known in the art for decades, many of the early and some of the recent mechanisms for adjusting and/or locking the foot at a desired angle to the tool housing are often cumbersome to use. A screwdriver, wrench, or the like is often required to tighten one or more threaded locking members such as bolts, which can be time consuming and even difficult if one does not have the appropriately sized and configured tool at hand. Sawdust and other debris created by the jigsaw can also combine with saw lubricants to foul the threaded locking member.

Some hand tools have an onboard locking lever to lock the foot in place at a desired orientation to the tool housing, which solves the problem of having the correct tool at hand, but often such locking levers were relatively costly to manufacture and cumbersome to install and adjust. Some hand operating levers may not conveniently provide the requisite holding strength, which when coupled with the substantial vibration developed during operation of a jigsaw can result in an undesirable change in the orientation angle of the foot.

Other solutions to movement of the foot have included foot assemblies that combine an onboard hand operable locking lever in combination with a plurality of guide openings that are selectively engageable with a locking extension which minimizes the possibility of the orientation angle changing during use.

SUMMARY OF THE INVENTION

A preferred embodiment of the present invention is a foot assembly for a power hand tool such as a jigsaw that has an angularly adjustable support foot with a generally flat bottom portion, at least two spaced apart supports connected to the support foot, with each support having a main aperture, an elongated rod extending through the main apertures of the supports in a configuration permitting limited sliding movement and the angular adjusting movement of the support foot relative to the hand tool, a retainer member associated with the hand tool for selectively engaging at least one of the supports to lock the support foot at predetermined angular positions, and a spring for urging the retainer member toward engagement with the at least one support.

A second embodiment includes a removable transparent plate that attaches to the support foot and has a faux laser line for a cutting aid.

DETAILED DESCRIPTION

Figure 1:
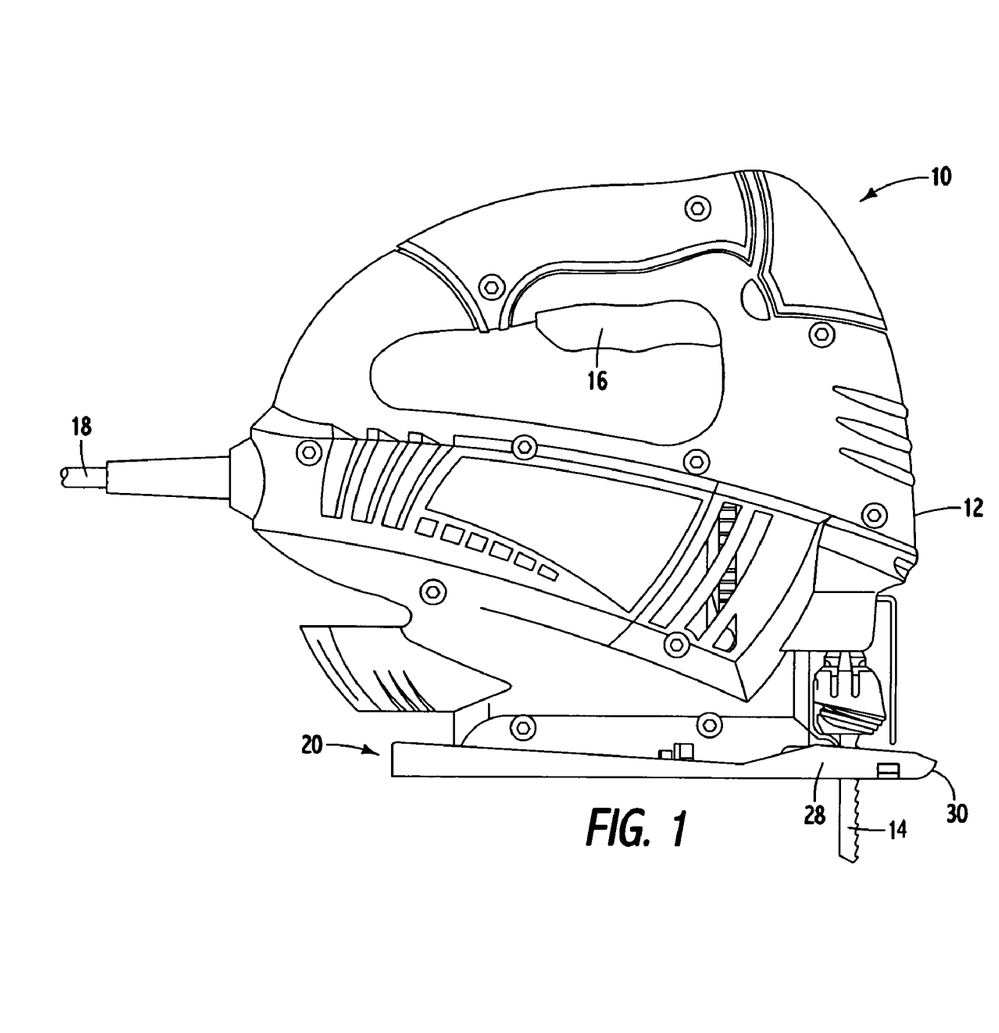
FIG. 1 is a right side view of a jigsaw having the preferred embodiment of the foot assembly of the present invention.
Figure 2:
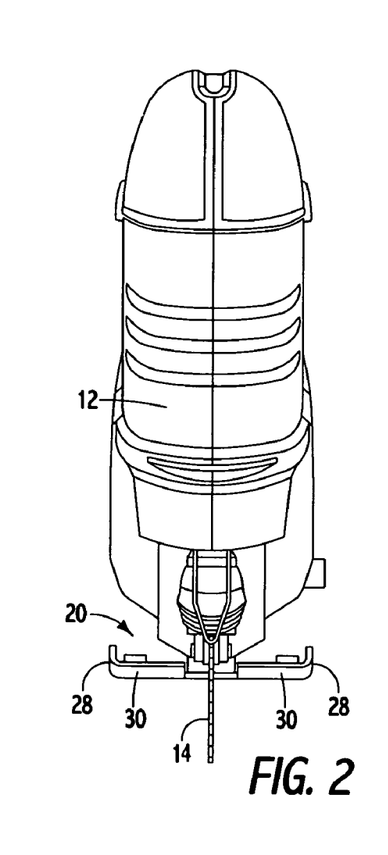
FIG. 2 is a front plan view of the jigsaw shown in FIG. 1

Turning now to the drawings, and particularly FIG. 1, a jigsaw, indicated generally at 10, has a housing 12 which encloses a motor such as an AC, DC, or universal motor, which is mechanically linked to and drives a reciprocating saw blade 14. An on/off switch 16 controls the motor, which is powered by an electrical source via cord 18. Alternatively, the jigsaw 10 may be configured to be powered by a battery pack as is known by those of ordinary skill in the art. Also, those who are knowledgeable in the art will appreciate that other components of jigsaws are generally known, and are not discussed in detail herein.

The jigsaw 10 has a foot assembly, indicated generally at 20, which is secured to the jigsaw housing 12 in a manner whereby it can be tilted, i.e., angularly adjusted relative to the blade 14. The foot assembly 20 can be adjusted to provide a perpendicular cut relative to the work piece or a 45° bevel cut in either direction. The angular adjustment of the foot assembly is easily made and requires no tools to be carried out. The user merely needs to push the foot assembly forwardly to release its locking mechanism and then tilt the foot assembly relative to the housing in one direction or the other and it will then be locked in a 45° bevel orientation.

It should be understood that while the illustrated embodiment will permit the angular positions of 0 and 45° in either direction, the foot assembly may be modified to provide other bevel angles, such as 22-½°, for example, if desired. In addition to the ease of operation of the present invention, it securely locks the angular orientation that is chosen so that there is little likelihood that the foot assembly can be unintentionally changed during operation. Also, the locking mechanism has a robust construction and should not be an impediment to a long useful life for the jigsaw.

Figure 6:
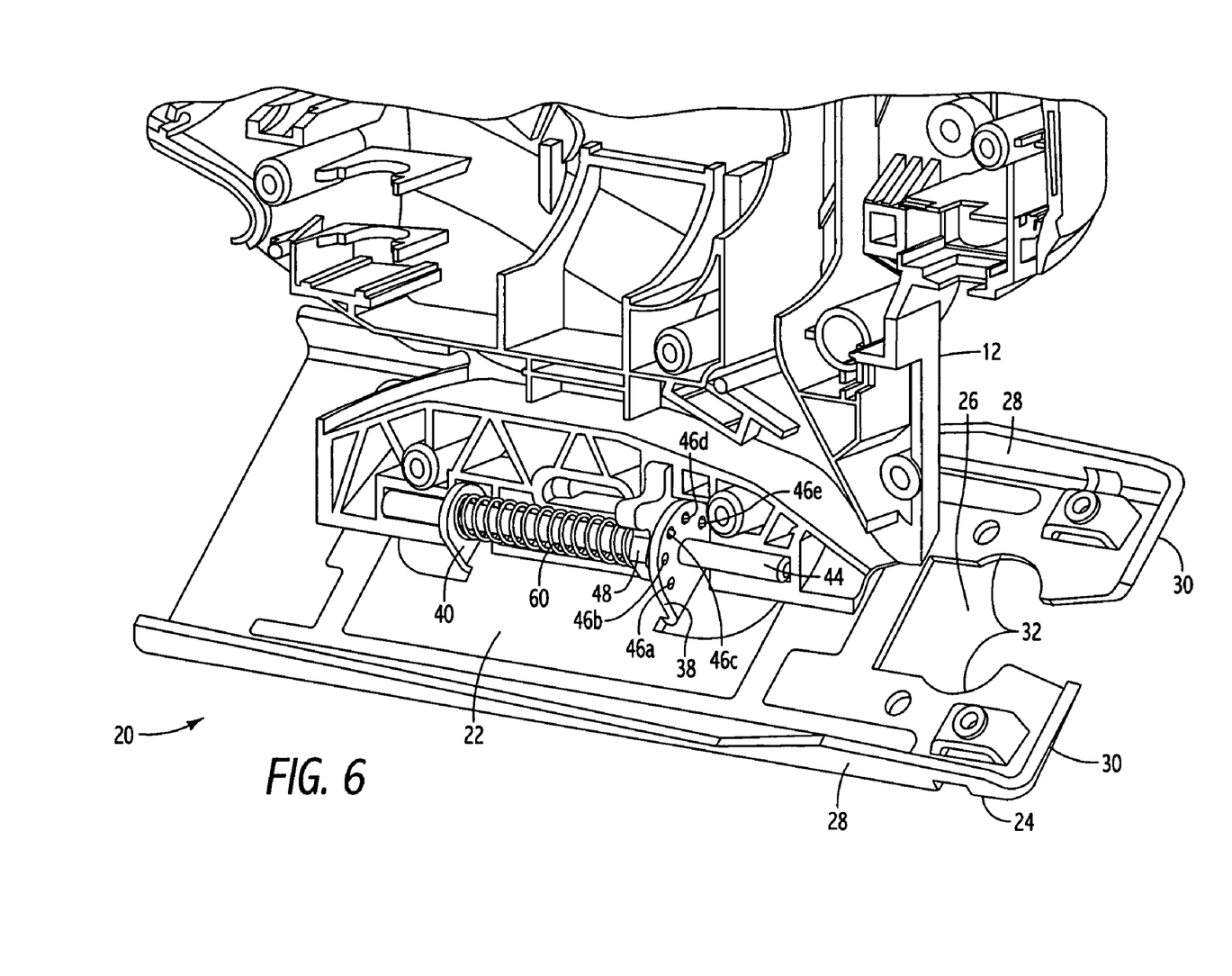
FIG. 6 is a right front perspective view of the jigsaw shown in FIG. 1 with portions removed, and illustrating the foot assembly in a 45 degree position, and in an locked position.
Figures 7, 8, 9:
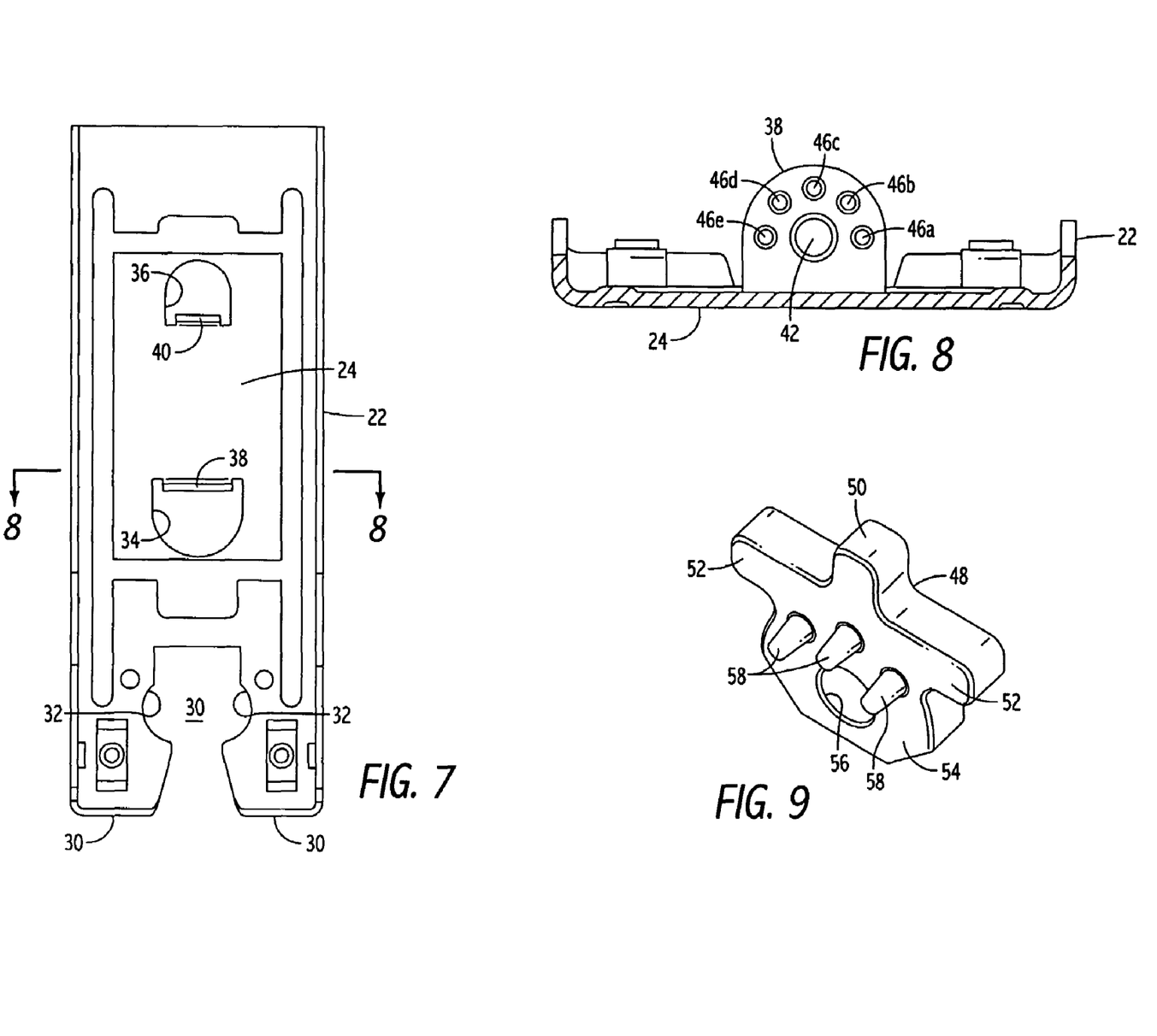
FIG. 7 is a top plan view of a support foot of the foot assembly shown in FIG. 1.
FIG. 8 is cross section taken generally along the line 8-8 of FIG. 7.
FIG. 9 is a perspective view of a retainer member of the foot assembly shown in FIG. 1.

The foot assembly 20 has a support foot 22 that has a generally flat bottom surface 24 which contacts a work piece that is being cut. The support foot 22 is preferably made of steel that is cut and stamped into its ultimate shape as shown in the drawings. As shown in FIGS. 1,6 and 7, the support foot 22 has a front opening 26, upturned sidewalls 28 and upturned front wall segments 30. Since during making curved cuts, the support foot will be moved sideways as well as forwardly, the upturn sidewalls as well as the front wall segments 30 contributes to smooth movement of the jigsaw over the work piece surface. By having a curved portion at the interface between the bottom surface and the sidewalls and front walls, there is less likelihood that an edge of the jigsaw will be caught by a work piece during operation.

As shown in FIG. 6, the opening 26 has an enlarged curved portions 32 on opposite sides of the opening which are centered around the position of the blade 14. The enlarged portion enables the foot assembly to be moved to either of the 45° bevel positions and not have the blade contact the support foot 22. In other words, the necessary clearance is provided by the enlarged portions 32.

The support foot 22 also has a front opening 34 and a rear opening 36 which are produced as the result of a cutting and/or stamping operation whereby the metal that was present before cutting is bent to form an upwardly directed perpendicular front support 38 and rear support 40. Each of the supports 38 and 40 has a main aperture 42 sized to receive an elongated rod 44 which provides an axis about which the foot assembly can rotate to be tilted between the desired positions. The rod 44 extends beyond both supports 38 and 40 and is retained by suitable recesses in the housing that are appropriately sized to hold the rod 44 firmly in place. In this regard, the housing 12 is preferably fabricated from two half sections, one of which is clearly visible in several of the drawings, including FIG. 1.

As is also evident from FIG. 1, the free ends of the supports 38 and 40 have a generally semi-circular outer shape which enables the support foot 22 to be rotated within the housing 12. The front support 38 also has a number of spaced apart positioning apertures 46a-e that are arranged in a semi-circular configuration that is also concentric with the rod 44.

The foot assembly 20 has a retainer member 48 best shown in FIG. 8, that has a top portion 50, a pair of wing portions 52 and a main portion 54, the latter of which has an aperture 56 sized to receive the rod 44. The member 48 also has three protrusions 58, 58 that are also spaced from one another and are aligned in a semi-circular orientation concentric with the opening 56 so that they match up with the positioning apertures 46a through 46e.

Figure 3:
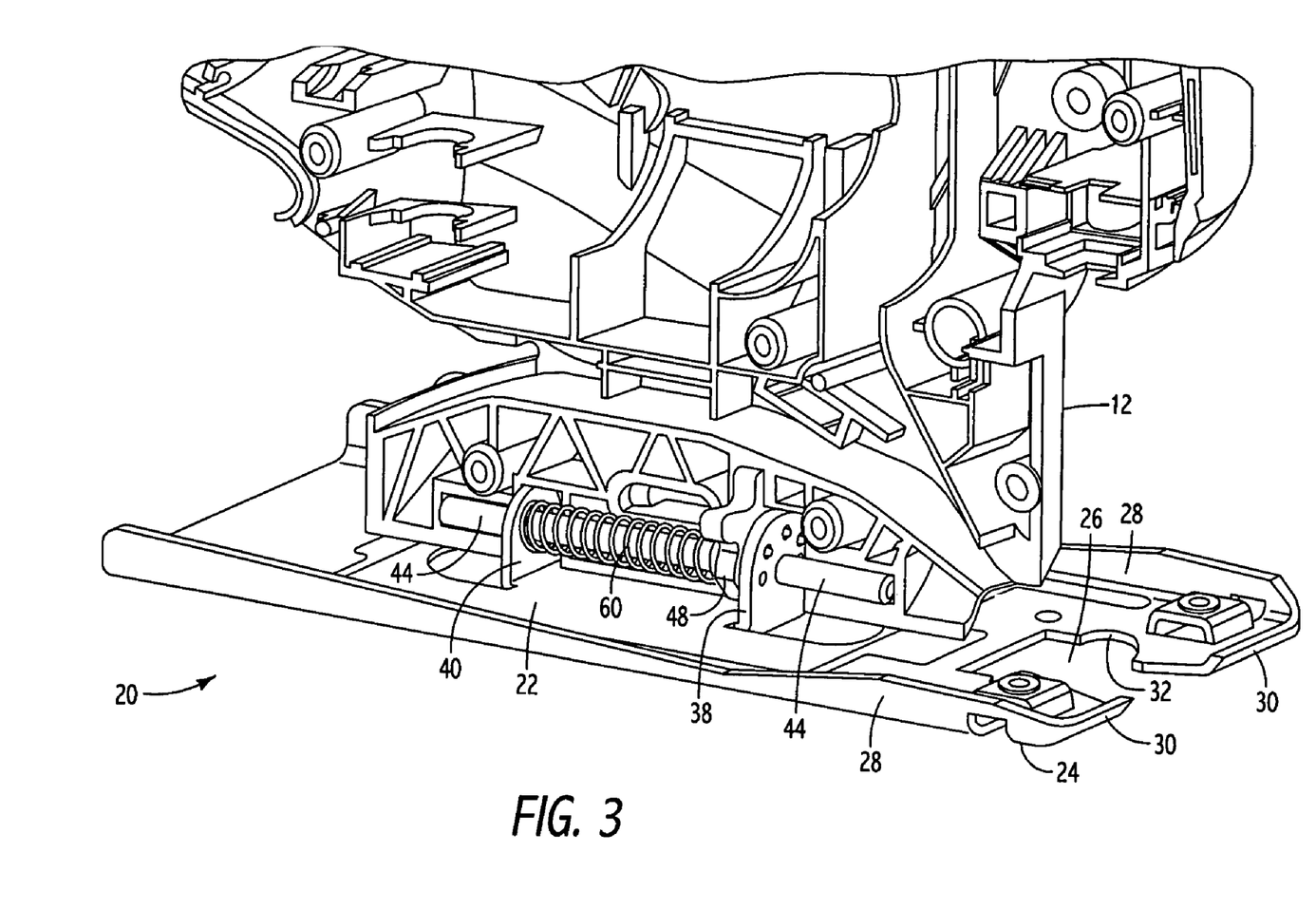
FIG. 3 is a right front perspective view of the jigsaw shown in FIG. 1 with portions removed, and illustrating the foot assembly locked in the 0 degree position.

As best shown in FIG. 3, the retainer member 48 is configured to fit within complementary recesses in the housing 12 so that when both housing sections are combined, the retainer member 48 will be firmly held in place. Because of the stresses that may be applied to the retainer member 48 during use, it is preferred that it be made of steel or other strong durable material. The member may be unitarily formed or cast with the protrusions being part of the casting or the casting may not include the protrusions 58, with those being separately fabricated and being force fit into suitable openings in the main portion 54.

A compression spring 60 fits over the rod 44 and bears against the face of the rear support 40 and against the side of the retainer member 48. The spring is preferably sized to provide a biasing force that is not easily overcome during normal use. Stated in other words, the spring force should be sufficient to keep the foot assembly in a stable locked position and not be accidentally changed during normal use. In this regard, a spring having force characteristics of about 35 Newtons to lock the foot assembly and about 50 Newtons to fully disengage the protrusions 58 from the positioning apertures 46 has been found to be effective.

Figure 4:
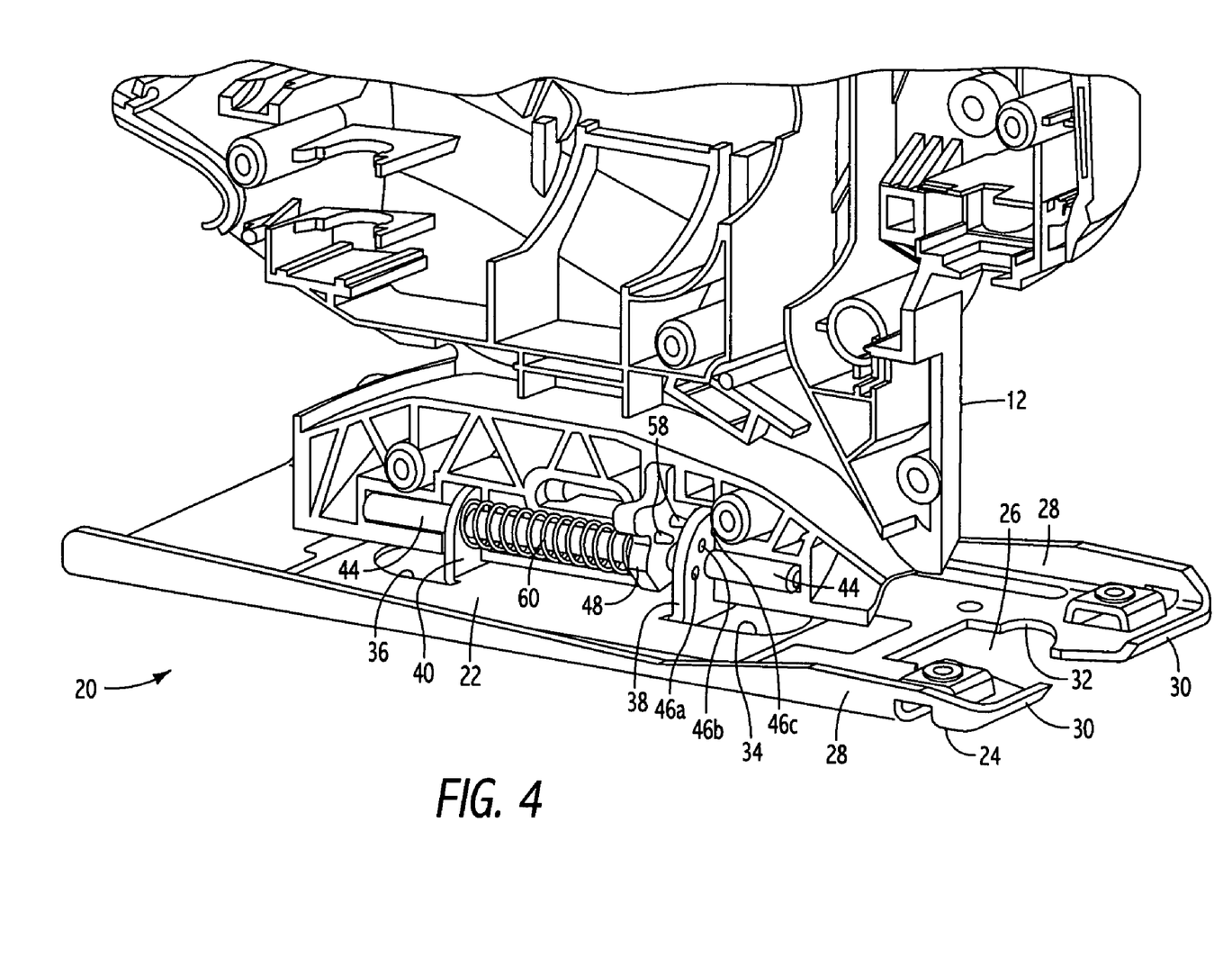
FIG. 4 is a right front perspective view of the jigsaw shown in FIG. 1 with portions removed, and illustrating the foot assembly in the 0 degree position, and in an unlocked position.
Figure 5:
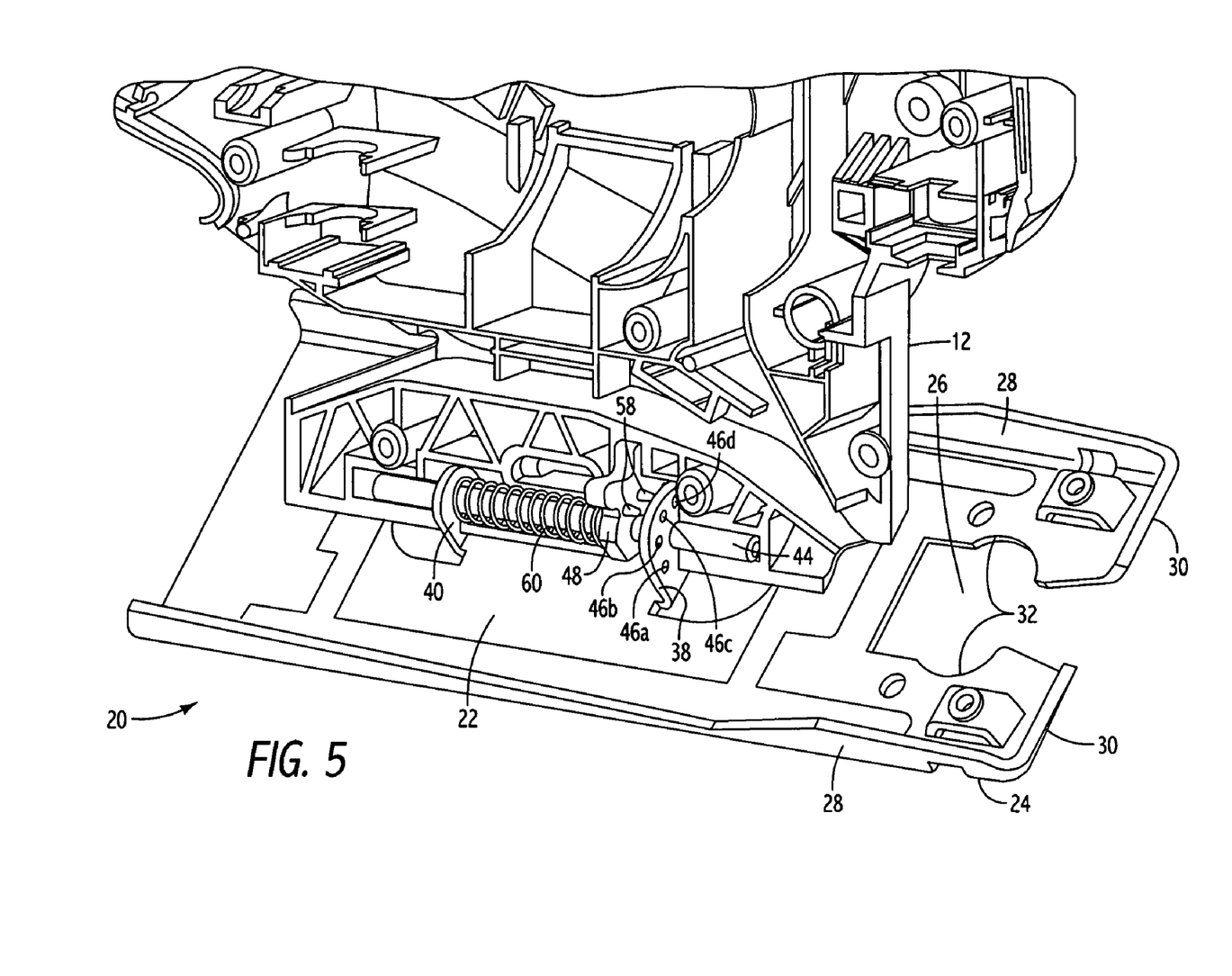
FIG. 5 is a right front perspective view of the jigsaw shown in FIG. 1 with portions removed, and illustrating the foot assembly in a 45 degree position, and in an unlocked position.

When the foot assembly is in the normal perpendicular cutting operating position as shown in FIG. 3, the protrusions 58 are inserted in positioning apertures 46b, 46c and 46d as shown. If the support foot 22 is pushed forwardly to disengage the protrusions 58 from the apertures 46 as shown in FIG. 4, the support foot 22 is free to be rotated to one of the 45° tilted positions, such as shown in FIG. 5. When the support foot 22 is released, the protrusions 58 will engage positioning apertures 46c, d and e, as shown in FIG. 6.

With any of the three possible positions that the support foot can be placed in, each of the three protrusions 58 will be inserted into one of the positioning apertures 46. This provides a stronger configuration than would occur if only a single or two protrusions were used and thereby also contributes to the strength of the connection and useful life of the product.

Figure 10:
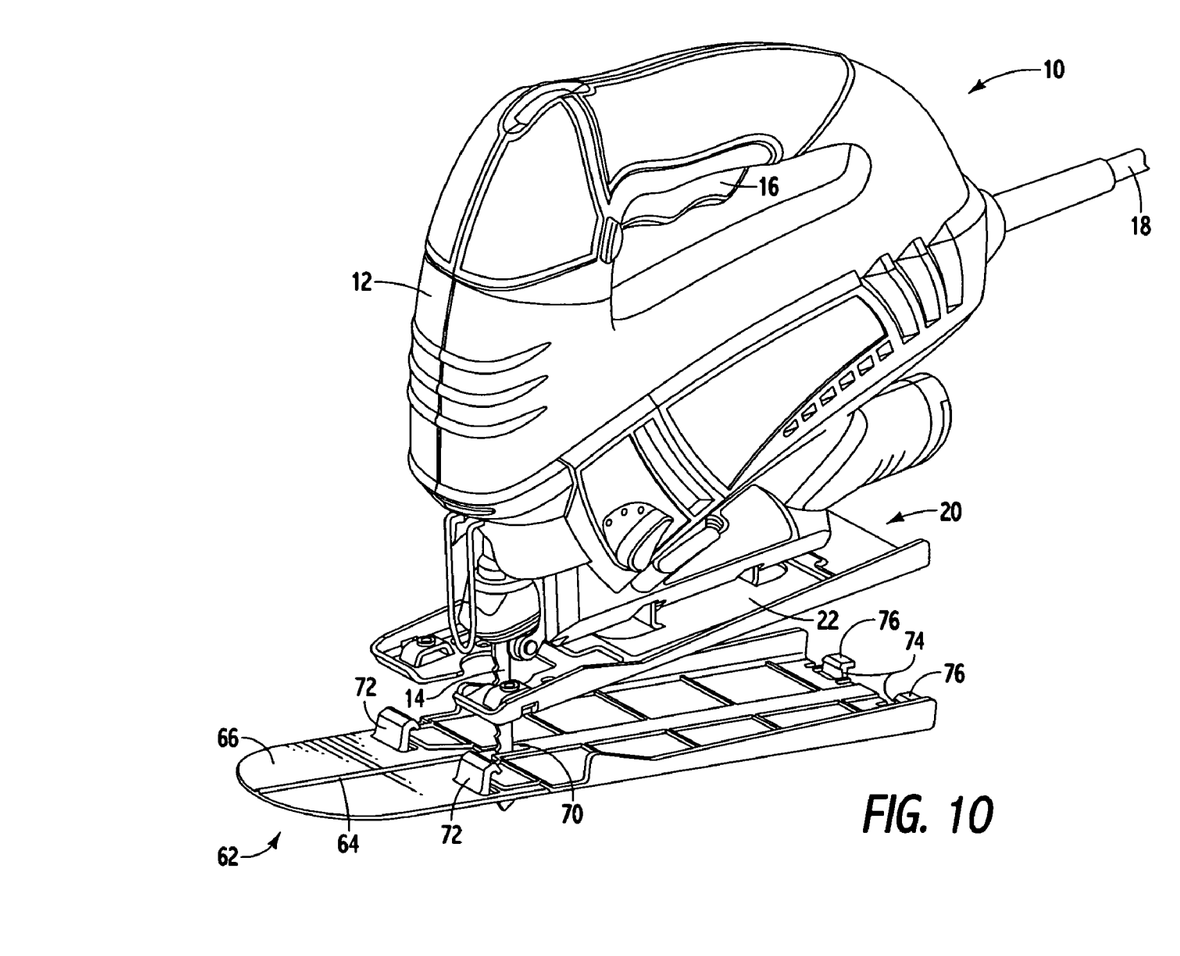
FIG. 10 is a perspective view of a jigsaw shown in FIG. 1, with a flat plate shown in position to be attached to the support foot of the foot assembly.
Figure 11:
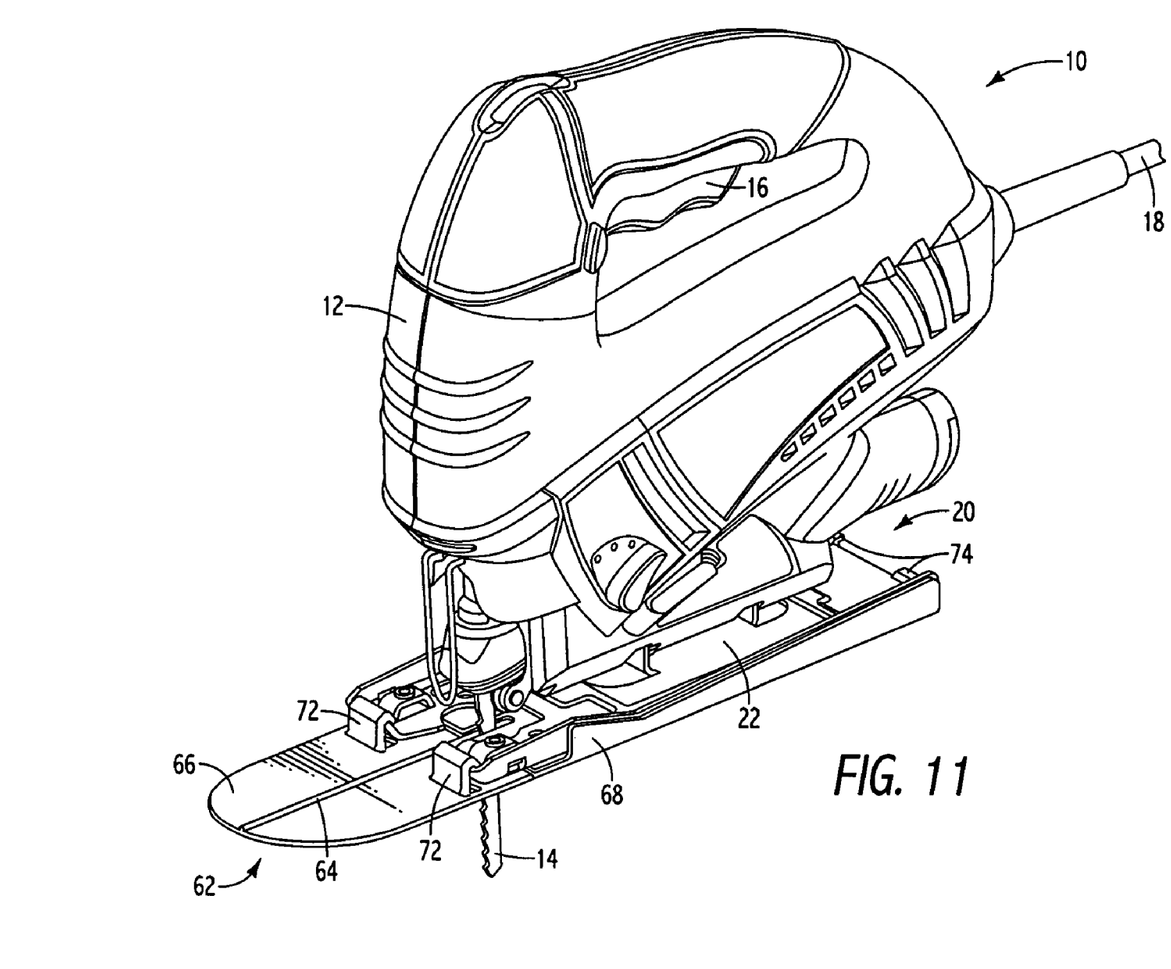
FIG. 11 is a perspective view of a jigsaw shown in FIG. 1, with a flat plate attached to the support foot of the foot assembly.

An alternative embodiment can include a removable transparent flat plate, indicated generally at 62, and shown in FIGS. 10 and 11, that attaches to said support foot 22 and has a faux laser line 64 on a front end portion 66 that functions as a cutting aid since it is preferably exactly in line with plane of the blade 14. The plate is preferably made from a strong transparent plastic or plastic-like material such as polycarbonite or ABS. Polycarbonite is preferred because it has excellent impact resistant qualities and high strength. To contribute to its strength, the plate preferably has upturned side portions 68 that fit around the side portions 28 of the support foot. As shown in FIG. 11, the front portion 66 extends forwardly of the front wall portions 30 of the support foot 22 so that the faux laser line 64 is easily visible to the user. The line 64 may be raised and painted or otherwise colored red (or other appropriate color) to approximate the appearance of a line generated by a laser. An elongated opening 70 is provided to permit the blade to extend through the plate. The elongated opening is preferably sized so that the plate can be attached to the support foot 22 without having to manipulate the blade height or remove it.

To attach the plate 62 to the support foot 22, a pair of front retaining hooks 72 extend upwardly from the front portion thereof for engaging the upper edge of the front walls 30 of the support foot 22, and a pair of deflectable clips 74 are located at the rear portion thereof for engaging a rear edge of support foot. The clips 74 have a tab 76 that can be pressed by the user to deflect the clips 74 so that a retaining edge which engages the rear edge of the support foot can be released. This enables the clips 74 of the back portion of the plate to clear the support foot 22 and enable the plate to be moved forwardly so that the hooks can be separated from the front wall portions 30. The hooks 72 and clips 74 are preferably integrally formed during the molding of the plate 62, although they may also be independently formed and adhesively attached or sonically welded if desired.

It will be appreciated that although discussion and description has been made herein of a particular tool and housing embodiment, such treatment has been made only to illustrate the invention. Other invention embodiments and equivalents to various features of the invention as described will be apparent to those skilled in the art. Also, in considering the jigsaw 10 and the foot assembly 20, it will be appreciated that exemplary embodiments of the present invention are directed to a tool such as the jigsaw 10, while others are directed only to the foot assembly 20. Indeed, those knowledgeable in the art will appreciate that the foot assembly 20 will provide benefits and advantages when used with power tools other than a jigsaw.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A foot assembly of a power hand tool, wherein the power hand tool has a housing with a greater lengthwise dimension than its width, the foot assembly being connected to the housing so as to be located below a lower portion of the housing, the foot assembly comprising:
   a support foot having a generally flat bottom portion with a flat bottom surface extending throughout a substantial part of the surface area of the flat bottom portion;
   at least front and rear spaced apart supports connected to said support foot and extending upwardly from said bottom portion, each of said supports having a main aperture;
   at least one connecting element associated with the housing and engaging said main apertures of said supports for providing limited lengthwise sliding movement and angular tilting movement of said support foot relative to the housing;
   a retainer member associated with the housing for movement with said housing for selectively engaging at least one of said supports to lock said tilting movement at one of a plurality of angular positions; and
   means for biasing said retainer member in said lengthwise direction toward engagement with said at least one support.

2. A foot assembly as defined in claim 1 wherein the power tool is a jigsaw with a blade.

3. A foot assembly as defined in claim 1 wherein said supports are tabs transversely extending from said bottom portion.

4. A foot assembly as defined in claim 3 wherein said tabs are formed from said bottom portion of said support foot.

5. A foot assembly as defined in claim 3 wherein said front support has a plurality of positioning apertures spaced apart from one another and configured in a generally semicircular segment concentrically positioned relative to said main aperture.

6. A foot assembly as defined in claim 5 wherein said retainer member is secured to the housing and comprises at least one protruding portion configured to selectively engage said positioning apertures.

7. A foot assembly as defined in claim 6 wherein said retainer member comprises at least two of said protruding portions spaced apart from one another and configured in a generally semicircular segment to selectively engage respective ones of said positioning apertures depending upon the angular orientation of said support foot relative to the housing.

8. A foot assembly as defined in claim 7 wherein said protruding portions have a generally tapered cylindrical shape.

9. A foot assembly as defined in claim 8 wherein said protruding portions comprise generally tapered cylindrical shaped metal pins that are press fit into generally cylindrical holes in said retaining member.

10. A foot assembly as defined in claim 3 wherein said connecting element comprises an elongated rod which passes through said main aperture in both of said supports and which is retained at opposite ends by the housing.

11. A foot assembly as defined in claim 10 wherein said biasing means comprises a compression spring positioned on said rod with one end bearing against said retainer member and the opposite end bearing against said rear support.

12. A foot assembly as defined in claim 1 wherein one of said supports has a plurality of positioning apertures configured to be selectively engaged by said retainer member.

13. A foot assembly as defined in claim 1 wherein said predetermined angular positions comprise a zero position and 45 degree positions on either side of said zero position.

14. A foot assembly as defined in claim 1 further comprising a removable transparent plate removably attached to said support foot, said plate having a faux laser line for a cutting aid.

15. A foot assembly as defined in claim 14 wherein said plate is a generally flat transparent plate attached to the bottom surface of said support foot, said plate having a blade opening through which a saw blade can extend, said plate having a forward extension beyond said blade opening with said faux laser line on said forward extension for indicating a line of cut.

16. A foot assembly as defined in claim 15 wherein said plate further comprises at least one retaining hook extending upwardly from the front portion thereof engaging a front part of said support foot and at least one clip located at the rear portion thereof engaging a rear part of said support foot.

17. A foot assembly as defined in claim 15 wherein said faux laser line is a red line.

18. A foot assembly for a power hand tool, the power hand tool including a housing, and having a front portion and a back portion, the foot assembly comprising:
   a support foot having a generally flat bottom portion with a flat bottom surface, said support foot being angularly adjustable relative to the housing about an axis extending from said front to said back portion of said power hand tool;
   front and rear upwardly extending spaced apart supports connected to said support foot, each of said supports having a main aperture therein;
   an elongated rod secured to said housing and extending through said main apertures of said supports, said elongated rod being collinear with said axis for providing limited sliding movement and said angular adjusting movement of said support foot relative to the housing;
   a retainer member associated with the housing to be movable with the housing for selectively engaging at least one of said supports to lock said support foot at one plurality of angular positions; and
   a spring for urging said retainer member along said axis toward engagement with said at least one support.

* * * * *